United States Patent [19]
Nagano et al.

[11] Patent Number: 5,748,826
[45] Date of Patent: May 5, 1998

[54] OPTICAL FIBER CORE

[75] Inventors: Ryuichiro Nagano, Tokyo; Yoichi Nagase; Hajime Tamura, both of Gyoda, all of Japan

[73] Assignees: Nippon Telegraph and Telephone Corporation; Toyokuni Electric Cable Co., Ltd., both of Tokyo, Japan

[21] Appl. No.: 754,445

[22] Filed: Nov. 19, 1996

[51] Int. Cl.$^6$ ................................ G02B 6/02; G02B 6/22
[52] U.S. Cl. ........................... 385/128; 385/126; 385/127
[58] Field of Search ................................. 385/128, 124, 385/145, 143, 123, 125, 126, 127

[56] References Cited

U.S. PATENT DOCUMENTS 5,381,504  1/1995  Novack et al. ....................... 385/128
5,644,670  7/1997  Fukuda et al. ....................... 385/124

*Primary Examiner*—Phan T. H. Palmer
*Attorney, Agent, or Firm*—Jordan and Hamburg

[57] ABSTRACT

An optical fiber core consists of an optical fiber, an ultraviolet curable resinous layer which covers an outside circumferential part of an optical fiber, and a covering layer covering an outside circumferential part of ultraviolet curable resinous layer. In addition, the covering layer is composing of a first covering layer using flexible thermoplastic resin and second covering layer using thermoplastic resin of semi-hard or hard material in order that it sufficiently fulfills squeezing, tensile, bending, temperature, and lateral pressure characteristics and an economic efficiency.

4 Claims, 4 Drawing Sheets

OPTICAL FIBER CORE

BACKGROUND OF THE INVENTION

This invention relates to an optical fiber core. Former optical fiber core consists of an optical fiber, ultraviolet curable resinous or silicone layer covering the outside circumferential part of optical fiber, and a covering layer covering the outside circumferential part of ultraviolet curable resinous or silicone layer. The covering layer uses materials of thermoplastic resin, nylon, or ultraviolet curable resin.

Although the covering layer of the above-mentioned optical fiber core provides added strength to an optical fiber, it did not fill sufficiently all characteristics of squeezing, tensile, bending, temperature, and lateral pressure and an economic efficiency because the covering layer is a single layer using the materials of thermoplastic resin, silicone or nylon layers, or ultraviolet curable resin.

Therefore, there is a fault that is optical fiber core has sacrificed characteristics.

SUMMARY OF THE INVENTION

In view of the foregoing, it is an object of the present invention to provide an optical fiber core which is able to fill sufficiently squeezing, tensile, bending, temperature, and lateral pressure characteristics and an economic efficiency by two covering layers which cover an outside circumferencial part of an optical fiber, that is, one is a first covering layer using flexible thermoplastic resin, and another is a second covering layer using thermoplastic resin of semi-hard or hard material.

The above and further objects and novel features of the invention will more fully appear from the following detailed description when the same is read in connection with the accompanying drawings. It is to be expressly understood, however, that the drawing is for the purpose of illustration only and is not intended as a definition of the limits of the invention.

DETAILED DESCRIPTION OF THE INVENTION

Preferred embodiments of the present invention will be described in more details referring to the accompanying drawings.

Figure 1:
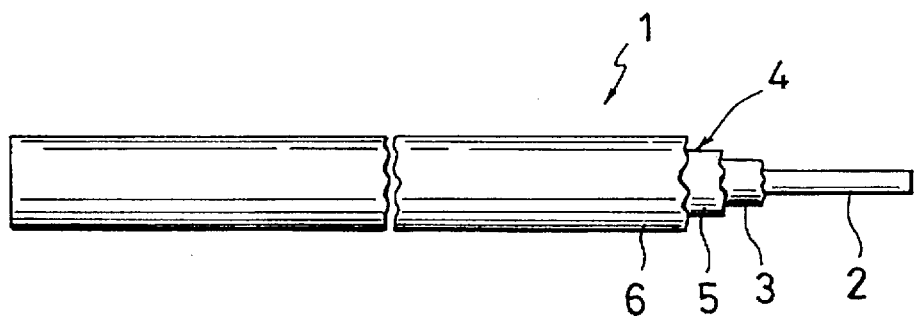
FIG. 1 is a top view showing the first embodiment of the present invention.
Figure 2:
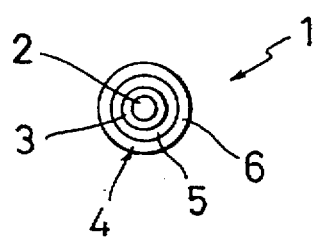
FIG. 2 is a side view showing the first embodiment of the present invention.
Figure 3:
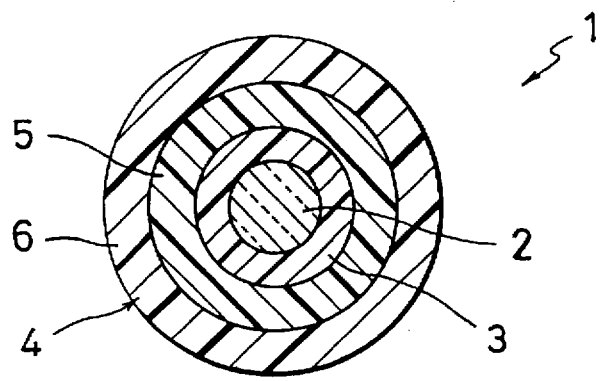
FIG. 3 is an expanded sectional view showing the first embodiment of the present invention.

FIGS. 1 to 3 illustrate a first embodiment of the present invention, wherein an optical fiber core 1 is composed of an optical fiber 2, ultraviolet curable resinous layer 3 which covers the outside circumferential part of the optical fiber 2, and a covering layer 4 which covers the outside circumferential part of ultraviolet curable resinous layer 3.

The covering layer 4 includes a first covering layer 5 which covers the outside circumferential part of the ultraviolet curable resinous layer 3 and a second covering layer 6 which covers an outside circumferential part of the first covering layer 5. The second covering layer 6 is a different material from the first covering layer 5.

According to this embodiment, the first covering layer 5 is a flexible thermoplastic resin having a Young's modulus in the range of 5–100 N/mm$^2$ such as polyvinyl chloride, and the second covering layer 6 is a to semi-hard or hard thermoplastic resin having a Young's modulus in the range of 200–500 N/mm$^2$ such as polyvinyl chloride.

Because the covering layer 4 of the optical fiber core 1 is composed of the first flexible covering layer 5 and the second covering layer 6 using semi-hard or hard material, this optical fiber core 1 is able to fill sufficiently squeezing, tensile, bending, and lateral pressure characteristics and an economic efficiency which are required as the optical fiber core 1.

Other embodiments of the present invention will now be described referring to FIGS. 4 to 9.

Through the drawings of the embodiments, like components are denoted by like numerals as of the first embodiment and will be explained in more details.

Figure 4:
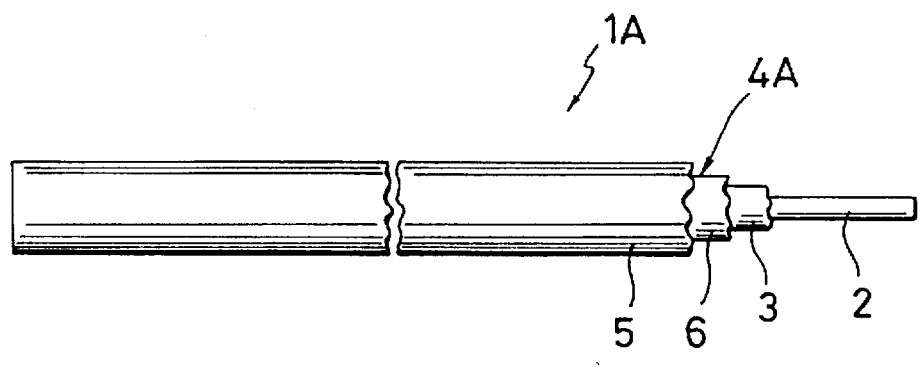
FIG. 4 is a top view showing the second embodiment of the present invention.
Figure 5:
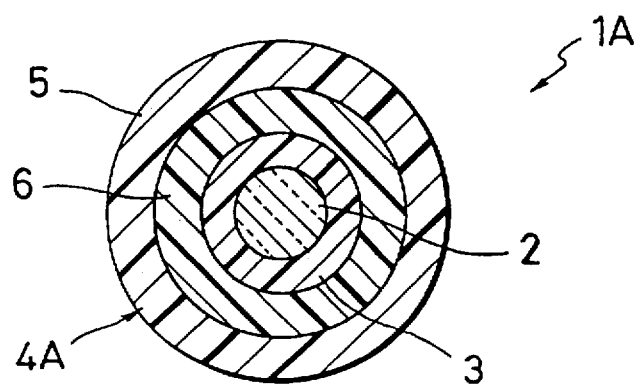
FIG. 5 is an expanded sectional view showing the second embodiment of the present invention.

FIGS. 4 and 5 show a second embodiment of the present invention which is distinguished from the first embodiment by the fact that the covering layer 4A has the second covering layer 6 which covering the outside circumferential part of ultraviolet curable resinous layer 3 and the first covering layer 5 covering the outside circumferential part of the second covering layer 6.

An optical fiber core 1A with the covering layer 4A according to the second embodiment will provide the same effects as the first embodiment.

Figure 6:
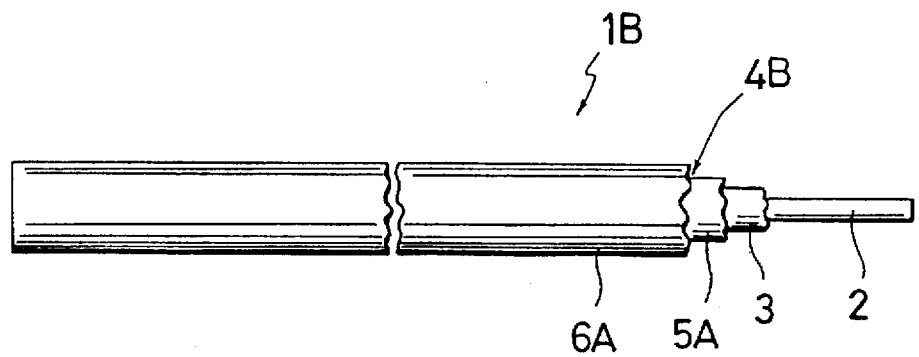
FIG. 6 is a top view showing the third embodiment of the present invention.
Figure 7:
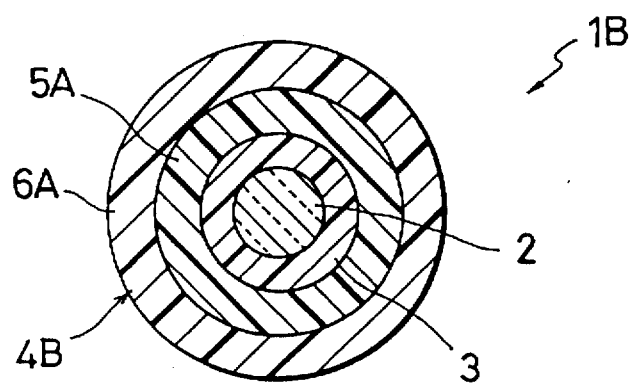
FIG. 7 is an expanded sectional view showing the third embodiment of the present invention.

FIGS. 6 and 7 illustrate the third embodiment of the present invention which is distinguished from the first embodiment by the fact that the covering layer 4B includes a first covering layer 5A, formed of a flexible PVC having a Young's modulus in the range of 5–100 N/mm$^2$, covering an outside circumferential part of ultraviolet curable resinous layer 3 and a second covering layer 6A, formed of a semi-hard or hard PVC having a Young's modulus in the range of 200–500 N/mm$^2$, covering the outside circumferential part of the first covering layer 5A.

An optical fiber core 1B with covering layer 4B according to the third embodiment will provide the same effects as the first embodiment.

Figure 8:
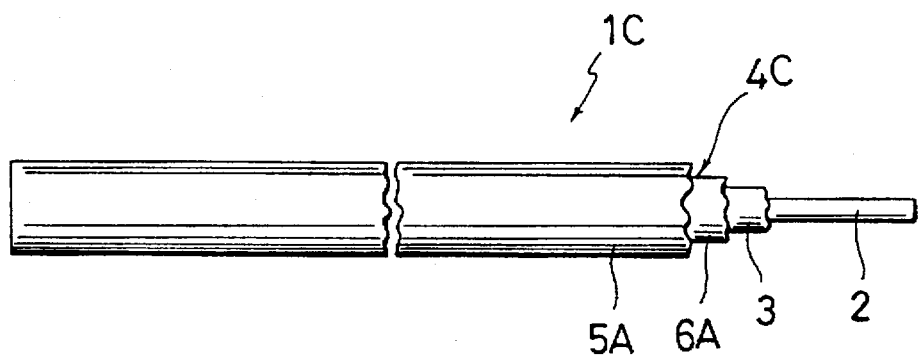
FIG. 8 is a top view showing the fourth embodiment of the present invention.
Figure 9:
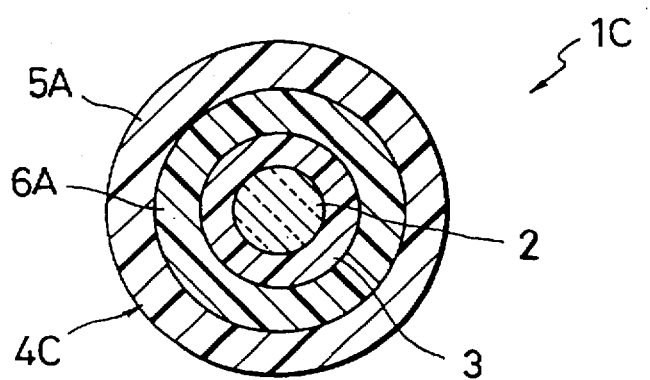
FIG. 9 is an expanded sectional view showing the fourth embodiment of the present invention.

FIGS. 8 and 9 illustrate a fourth embodiment of the present invention which is distinguished from the first embodiment by the fact that a covering layer 4C consists of the second covering layer 6A, formed of the semi-hard or hard PVC having a Young's modulus in the range of 200–500 N/mm$^2$, covering the outside circumferential part of ultraviolet curable resinous layer 3 and the first covering layer 5A, formed of the flexible PVC having a Young's modulus in the range of 5–100 N/mm$^2$, covering the outside circumferential part of the second covering layer 6A.

An optical fiber core 1C with the covering layer 4C according to the fourth embodiment will provide the same effects as the first embodiment.

As set forth above, the advantages of the present invention are as follows:

(1) An optical fiber core is composed of an optical fiber, an ultraviolet curable resinous layer which covers the outside circumferential part of an optical fiber, and the covering layer which covers the outside circumferential part of ultraviolet curable resinous layer. In addition, this covering layer is formed with the first covering layer using the flexible thermoplastic resin and the second covering layer using thermoplastic resin of semi-hard or hard material. Then, this optical fiber core is able to fill sufficiently squeezing, tensile, bending, temperature, lateral pressure characteristics and an economic efficiency because the covering layer is composed of the first flexible covering layer and the second semi-hard or hard covering layer.

Therefore, it can provide the set characteristics beforehand.

(2) As depicted in the above paragraph (1) it can be manufactured easily because the structure is simple.

(3) As depicted in the above paragraph (1) the characteristics corresponding to a desired use are obtained by selection of the quality of material and the measure in thickness of each layer regarding the first and second covering layer which are composing the covering layer.

Therefore, it can be used to make into the characteristics corresponding to a used aim.

What is claimed is:

1. A jacketed optical fiber comprising:

an optical fiber;

an ultraviolet curable resinous layer covering an outside circumferential part of said optical fiber; and a covering layer covering an outside circumferential part of said ultraviolet curable resinous layer, said covering layer including:

a first covering layer covering said outside circumferential part of said ultraviolet curable resinous layer, said first covering layer being formed of a flexible thermoplastic resin having a Young's modulus in the range of 5–100 N/mm$^2$; and a second covering layer covering said outside circumferential part of said first covering layer, said first covering layer being formed of a thermoplastic resin which is semi-hard to hard having a Young's modulus in the range of 200–500 N/mm$^2$.

2. A jacketed optical fiber comprising:

an optical fiber;

an ultraviolet curable resinous layer covering an outside circumferential part of said optical fiber;

a covering layer covering an outside circumferential part of said ultraviolet curable resinous layer, said covering layer including a first and a second cover in a layer;

said second covering layer covering the outside circumferential part of said ultraviolet curable resinous layer, said second layer being formed of a semi-hard to hard PVC having a Young's modulus in the range of 200–500 N/mm$^2$; and said first covering layer covering an outside circumferential part of said second covering layer, said first layer being formed of a flexible PVC having a Young's modulus in the range of 5–100 N/mm$^2$.

3. A jacketed optical fiber comprising:

an optical fiber;

an ultraviolet curable resinous layer covering an outside circumferential part of said optical fiber;

a covering layer covering an outside circumferential part of said ultraviolet curable resinous layer; said covering layer including a first and a second covering layer;

said second covering layer covering said outside circumferential part of said ultraviolet curable resinous layer, said second covering layer being formed of a semi-hard to hard thermoplastic resin having a Young's modulus in the range of 200–500 N/mm$^2$; and said first covering layer covering an outside circumferential part of said second covering layer, said first covering layer being formed of a flexible thermoplastic resin having a Young's modulus in the range of 5–100 N/mm$^2$.

4. A jacketed optical fiber comprising:

an optical fiber;

an ultraviolet curable resinous layer covering an outside circumferential part of said optical fiber;

a covering layer covering an outside circumferential part of said ultraviolet curable resinous layer, said covering layer including a first and a second covering layer;

said first covering layer covering the outside circumferential part of said ultraviolet curable resinous layer, said first covering layer being formed of flexible PVC having a Young's modulus in the range of 5–100 N/mm$^2$; and said second covering layer covering an outside circumferential part of said first covering layer, said second covering layer being formed of a semi-hard to hard PVC having a Young's modulus in the range of 200–500 N/mm$^2$.

* * * * *